United States Patent [19]

Kurg

[11] Patent Number: 4,607,280

[45] Date of Patent: Aug. 19, 1986

[54] VIDEO PROJECTOR WITH MOUNTING ASSEMBLY ENABLING LONGITUDINAL AXES OF THREE CRT'S TO BE TILTED SIMULTANEOUSLY WHILE MAINTAINING OPTICAL ALIGNMENT

[75] Inventor: Maarjus Kurg, Cambridge, Canada

[73] Assignee: Electrohome Limited, Kitchener, Canada

[21] Appl. No.: 647,845

[22] Filed: Sep. 6, 1984

[51] Int. Cl.$^4$ .............................................. H04N 9/31
[52] U.S. Cl. ........................................ 358/60; 358/64
[58] Field of Search ....................... 358/56, 60, 61, 62, 358/63, 64, 65, 230, 231, 237, 250; 352/67; 353/31

[56] References Cited

U.S. PATENT DOCUMENTS

| | | | |
|---|---|---|---|
| 2,965,706 | 12/1960 | Ridgeway | 358/60 |
| 2,973,683 | 3/1961 | Rowe et al. | 358/60 |
| 4,151,554 | 4/1979 | Tucker | 358/64 |

FOREIGN PATENT DOCUMENTS 106979  6/1983  Japan .................................... 358/60

Primary Examiner—James J. Groody
Assistant Examiner—Randall S. Svihla
Attorney, Agent, or Firm—Sim & McBurney

[57] ABSTRACT

A top-to-bottom focussing arrangement which maintains convergence is provided for a video projector employing separate red, green and blue cathode ray tubes (CRT's) and a dichroic mirror assembly. Each CRT has a mounting bracket, and the mounting bracket is pivotably mounted with respect to the dichroic mirror assembly to permit changes in the inclination of the longitudinal axis of the CRT to be effected. Simultaneous and equal changes in the inclinations of the longitudinal axes of the CRT's are effected by means of a rotatable member having rigid connecting arms pivotably connected thereto and pivotably connected to the mounting brackets.

5 Claims, 3 Drawing Figures

4,607,280

VIDEO PROJECTOR WITH MOUNTING ASSEMBLY ENABLING LONGITUDINAL AXES OF THREE CRT'S TO BE TILTED SIMULTANEOUSLY WHILE MAINTAINING OPTICAL ALIGNMENT

BACKGROUND OF THE INVENTION

This invention relates to a video projector. More particularly, this invention relates to an RGB projector of the type employing a dichroic mirror assembly and separate red, green and blue cathode ray tubes operatively associated therewith.

One of the problems with a video projector of this type has to do with varying the top-to-bottom focussing thereof while maintaining convergence. In order to do this properly, the inclinations of the longitudinal axes of all of the cathode ray tubes (CRT's) must be varied the same amount in the same direction. One technique for accomplishing this has been to mount each CRT in its own mounting bracket, pivotably mount each mounting bracket to permit the inclination of the longitudinal axis of the CRT mounted therein to be varied, and provide a rotatable cam with three identical cam surfaces which coact with individual ones of the mounting brackets. The problem with this arrangement, however, is the lack of restraint of the mounting brackets giving rise to possible damage to the apparatus when it is moved.

The foregoing problem is solved, in accordance with the present invention, by the provision of apparatus that not only permits focussing to be varied while maintaining convergence, but also fully restrains the CRT's via their mounting brackets against unwanted movement.

SUMMARY OF THE INVENTION

An aspect of the invention is as follows:

In combination with a video projector employing a dichroic mirror assembly including a final aperture through which light to be projected passes and red, green and blue cathode ray tubes operatively arranged with respect to said dichroic mirror assembly to project red, green and blue light respectively into said dichroic mirror assembly for passage through or reflection by said dichroic mirror assembly followed by passage through said final aperture, a separate mounting bracket for each of said cathode ray tubes, means pivotably mounting each of said mounting brackets to permit the inclination of the longitudinal axis of each of said cathode ray tubes to be varied, and means for simultaneously varying the inclination of the longitudinal axis of each cathode ray tube by the same amount to vary the top-to-bottom focussing of an image projected by said video projector while maintaining convergence, said varying means comprising a rotatable member, three rigid connecting arms pivotably connected to said rotatable member and means pivotably connecting said connecting arms to individual and different ones of said mounting brackets, whereby upon rotation of said rotatable member each of said mounting brackets is pivoted to the same extent as the others by movement of said connecting arms.

BRIEF DESCRIPTION OF THE DRAWINGS

This invention will become more apparent from the following detailed description, taken in conjunction with the appended drawings, in which.

DETAILED DESCRIPTION OF THE INVENTION INCLUDING THE PREFERRED EMBODIMENT

Figure 3:
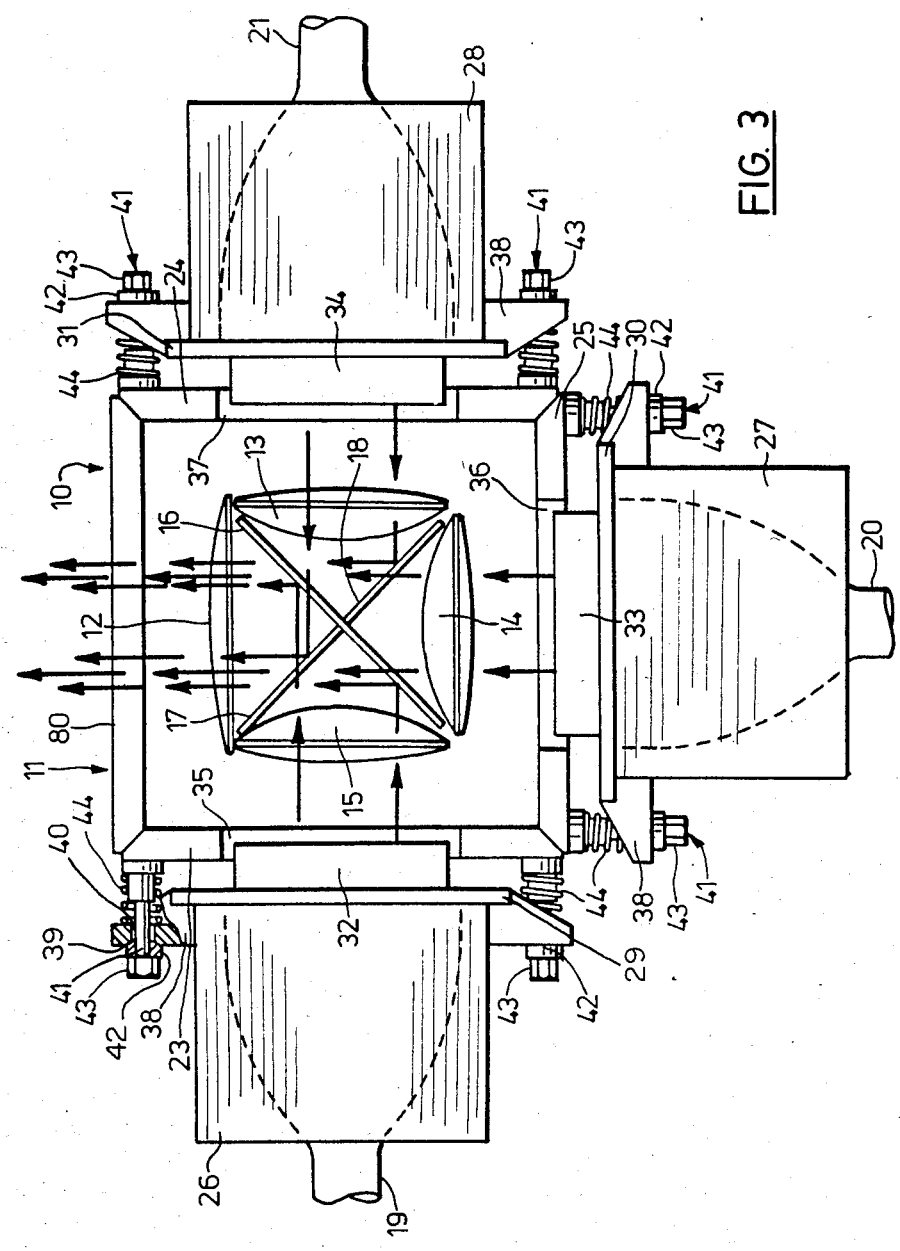
FIG. 3 is a top elevation of the video projector shown in FIG. 1 with the upper wall of the dichroic mirror housing removed.

A video projector embodying the present invention employs a known dichroic mirror assembly 10 that is shown best in FIG. 3. It includes a housing 11 containing lenses 12, 13, 14 and 15 and dichroic mirrors 16, 17 and 18 arranged as shown.

Figure 1:
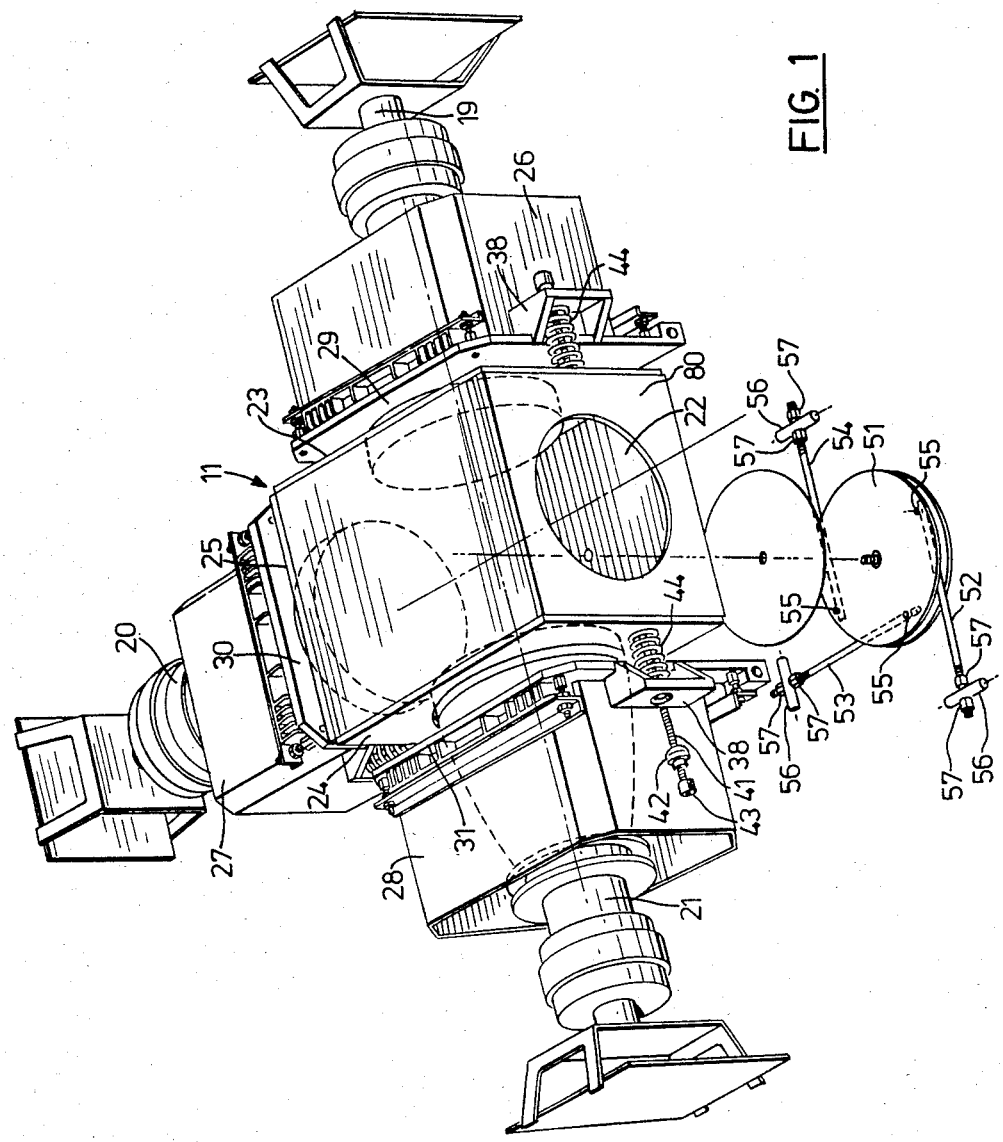
FIG. 1 is a perspective view of a video projector embodying the present invention.

Red, green and blue CRT's 19, 20 and 21 are operatively arranged with respect to assembly 10 to project red, green and blue light respectively into dichroic mirror assembly 10 for passage through or reflection by the dichroic mirrors followed by passage through the final aperture 22 (FIGS. 1 and 2) in the front wall 80 of housing 11. More specifically, red, blue and green CRT's 19, 21 and 20 are pivotably mounted on the side walls 23 and 24 and on the rear wall 25 respectively of housing 11. The red and blue CRT's 19 and 21 are directly opposite each other and normally are mounted with their longitudinal axes in exact alignment with each other. The green CRT 20 has its longitudinal axis at right angles to those of the red and blue CRT's and normally is mounted so that the longitudinal axes of all three CRT's lie in the same plane.

Figure 2:
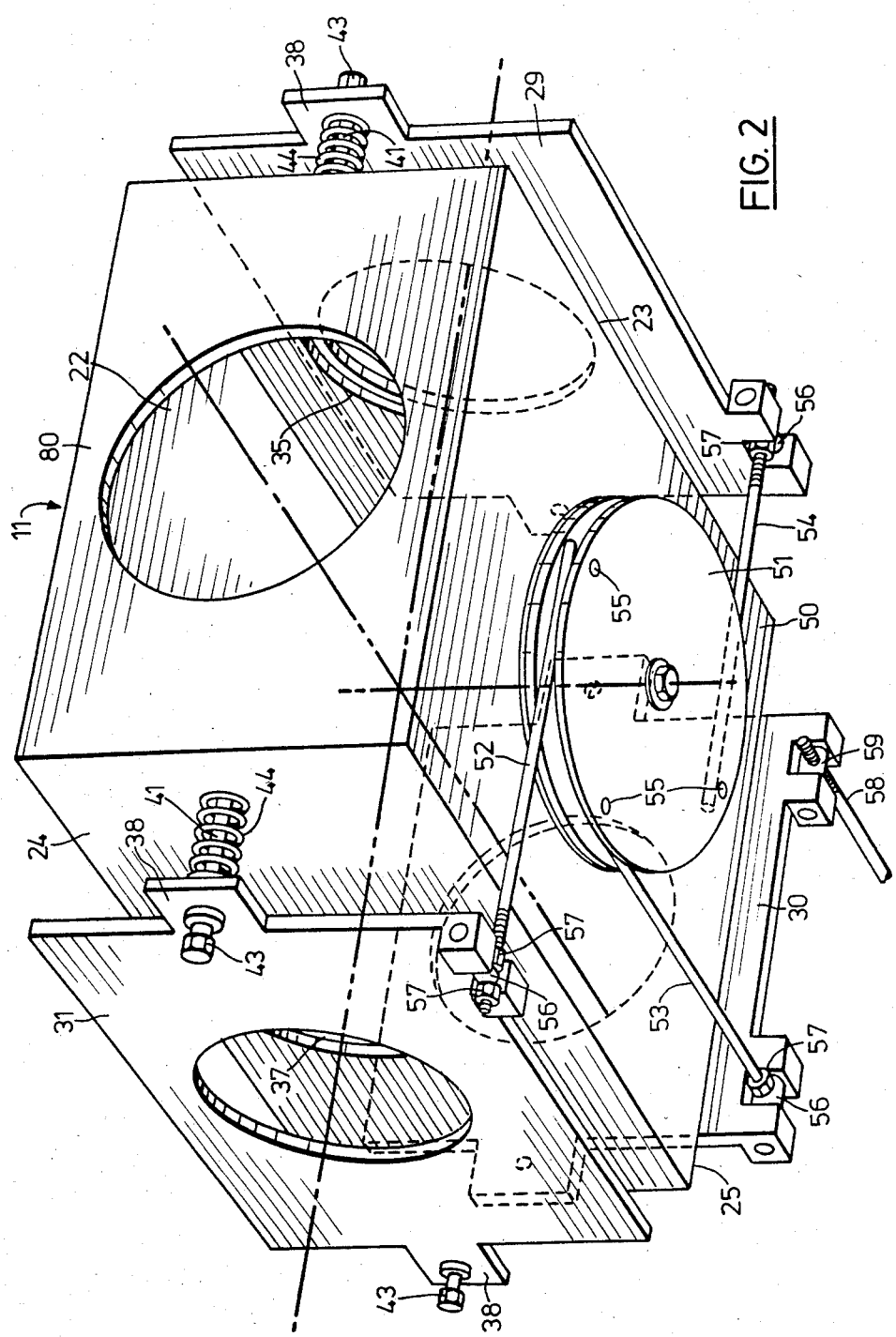
FIG. 2 is a perspective view of the optical focussing and restraint system embodying this invention.

As best shown in FIG. 3, but also at least in part in FIG. 2, the CRT's 19, 20 and 21 have their own housings 26, 27 and 28 respectively, the housings including mounting brackets 29, 30 and 31 respectively. The CRT's also have their own lens (not shown) in lens holders 32, 33 and 34 respectively that constitute extensions of housings 26, 27 and 28 respectively and which project part way into openings 35, 36 and 37 respectively in walls 23, 25 and 24 respectively.

Mounting brackets 29, 30 and 31 are shown in greater detail in FIG. 2, to which reference now is made. Each mounting bracket is pivotably mounted on its associated side or rear wall of housing 11 in the same way, so only the mounting arrangement for bracket 29 will be described. Thus, on each side of bracket 29 there is an integral tab 38. A hemispherical bearing seat 39 (FIG. 3) is formed in the surface of each tab remote from dichroic mirror assembly 10. The bearing seats communicate with smaller openings 40 through which extend bolts 41 that extend perpendicularly to side wall 23 and are secured thereto, e.g., by being threadably engaged with threaded openings (not shown) in side wall 23. Seated in bearing seats 39 are bearings 42 having hemispherical bearing surfaces on the sides thereof adjacent seats 39. Bearings 42 are closely mounted on bolts 41 and can slide thereon. Bolt heads 43 on bolts 41 hold bearings 42 in position on bolts 41 while springs 44 surrounding bolts 41 bias mounting bracket 29 away from side wall 23. It can be seen from the nature of the mounting of bracket 29 that it can pivot about an axis drawn between its two bearing seats 39.

Rotatably mounted on the lower wall 50 of housing 11 is a disc 51. Rigid connecting arms 52, 53 and 54 are pivotably connected to the periphery of disc 51 by means of pivot pins 55. The other ends of arms 52, 53 and 54 are pivotably connected to mounting brackets 31, 30 and 29 respectively. Thus, as shown in FIG. 2, the end of rod 52 that is pivotably connected to mounting bracket 31 is threaded and passes through an untapped opening in a pin 56 that is rotatably mounted on mounting bracket 31. Nuts 57 threadably engage the threaded end of rod 52 on either side of pin 55 and serve as stops. By varying the position of nuts 57 it is possible to alter the inclination of the longitudinal axis of CRT 21. Rods 53 and 54 are connected to mounting brackets 30 and 29 respectively in the same way as rod 52 is connected to mounting bracket 31.

Rotation of disc 51 is effected by means of a control rod 58 (FIG. 2) that threadably engages with a threaded opening in a pin 59 that is rotatably mounted on mounting bracket 30. Rod 58 is mounted so as to be incapable of longitudinal movement. Consequently, rotation of rod 58 in either direction causes mounting bracket 30 to pivot about an axis drawn through its bearing seats 39 to thereby incline the longitudinal axis of CRT 20 either upwardly or downwardly from its previous position depending on the direction of rotation of rod 58. This pivoting movement of mounting bracket 30 is transmitted to disc 51 via connecting arm 53 causing disc 51 to rotate which, in turn, causes connecting arms 52 and 54 to pivot mounting brackets 31 and 29 respectively and their associated CRT's.

When apparatus embodying this invention is first set up, by means of adjusting bolts 41 and nuts 57 on connecting arms 52, 53 and 54 and by rotating control rod 58, each of mounting brackets 29, 30 and 31 can be spaced an equal distance from the dichroic mirror assembly with the mounting brackets each being precisely parallel to the walls of housing 11 on which the mounting brackets are pivotably mounted, i.e., with the longitudinal axes of CRT's 19, 20 and 21 all lying in the same plane, with the longitudinal axes of CRT's 19 and 21 being precisely aligned with each other, and with the longitudinal axis of CRT 20 being inclined at 90° to the longitudinal axes of CRT's 19 and 21.

Electrical signals are applied to CRT's 19, 20 and 21 causing varying amounts of red, green and blue light to be supplied to dichroic mirror assembly 10 from the CRT's as scanning of their rasters takes place. The red light from CRT 19 passes through lens 15. Part of it reflects from mirror 16, while another part passes through mirror 17 and then is reflected by mirror 16. Blue light from CRT 21 passes through lens 13. A part of it is reflected by mirror 18. Another part passes through mirror 16 and then is reflected by mirror 17. Green light from CRT 20 passes directly through all of the mirrors 16, 17 and 18.

When it is desired to alter the focussing of the image from top to bottom while maintaining convergence, as it may be necessary to do when the projection screen is located above or below the video projector, it is only necessary to rotate control rod 58 in one direction or the other causing pivoting of mounting bracket 30 and a consequent change in the inclination of the longitudinal axis of CRT 20. The pivoting of mounting bracket 30 is transmitted via connecting arm 53 to disc 51 causing a rotation of disc 51 that is transmitted via connecting arms 52 and 54 to cause mounting brackets 31 and 29 respectively to pivot precisely the same amount as mounting bracket 30, thereby to alter the inclination of the longitudinal axes of CRT's 21 and 19 respectively to precisely the same extent as that of the longitudinal axis of CRT 20. In this manner the light path from each of the CRT's through the lenses and dichroic mirror assembly is altered to vary the focussing, but convergence is maintained.

Because rigid connecting arms 52, 53 and 54 are employed between disc 51 and each mounting bracket, the mounting brackets are held firmly in position, each being effectively in three point suspension.

While a preferred embodiment of this invention has been disclosed herein, those skilled in the art will appreciate that changes and modifications may be made therein without departing from the spirit and scope of this invention as defined in the appended claims.

The embodiments of the invention in which an exclusive property or privilege is claimed are defined as follows:

1. In combination with a video projector employing a dichroic mirror assembly including a final aperture through which light to be projected passes and red, green and blue cathode ray tubes operatively arranged with respect to said dichroic mirror assembly to project red, green and blue light respectively into said dichroic mirror assembly for passage through or reflection by said dichroic mirror assembly followed by passage through said final aperture, a separate mounting bracket for each of said cathode ray tubes, means pivotably mounting each of said mounting brackets to permit the inclination of the longitudinal axis of each of said cathode ray tubes to be varied, and means for simultaneously varying the inclination of the longitudinal axis of each cathode ray tube by the same amount to vary the top-to-bottom focussing of an image projected by said video projector while maintaining convergence, said varying means comprising a rotatable member, three rigid connecting arms pivotably connected to said rotatable member and means pivotably connecting said connecting arms to individual and different ones of said mounting brackets, whereby upon rotation of said rotatable member each of said mounting brackets is pivoted to the same extent as the others by movement of said connecting arms.

2. Apparatus according to claim 1 wherein said means pivotably mounting each of said mounting brackets comprises two part-spherical bearing seats carried by said mounting bracket at spaced apart locations, part-spherical bearings mounted in said bearing seats and spring means urging said mounting bracket against said bearings.

3. Apparatus according to claim 2 further including bearing mounting means extending through said bearings and on which said bearings are mounted, said bearing mounting means being secured to said dichroic mirror assembly.

4. Apparatus according to claim 3 including means holding said bearings on said bearing mounting means against the forces of said spring means.

5. Apparatus according to claim 4 wherein said spring means surround said bearing mounting means and are positioned between said dichroic mirror assembly and said mounting brackets.

* * * * *